United States Patent
McCoy et al.

(10) Patent No.: US 7,672,262 B2
(45) Date of Patent: Mar. 2, 2010

(54) SYSTEM, METHOD, AND APPARATUS FOR COMMAND AND CONTROL OF REMOTE INSTRUMENTATION

(75) Inventors: Robert McCoy, Talala, OK (US); Brian Haapanen, Tulsa, OK (US); Richard Bristow, Porter, TX (US); Bryan Schulze, Owasso, OK (US); Gordon Besser, Claremore, OK (US); Douglas Detherow, Inola, OK (US)

(73) Assignee: Baker Hughes Incorporated, Houston, TX (US)

(*) Notice: Subject to any disclaimer, the term of this patent is extended or adjusted under 35 U.S.C. 154(b) by 767 days.

(21) Appl. No.: 11/112,589

(22) Filed: Apr. 22, 2005

(65) Prior Publication Data

US 2006/0240818 A1 Oct. 26, 2006

(51) Int. Cl.
*H04B 7/185* (2006.01)
(52) U.S. Cl. .................. 370/316; 370/310; 370/401; 455/412.1
(58) Field of Classification Search ........... 370/310, 370/316; 455/412.1
See application file for complete search history.

(56) References Cited

U.S. PATENT DOCUMENTS

| | | | |
|---|---|---|---|
| 5,335,730 A | 8/1994 | Cotham, III | |
| 6,046,685 A | 4/2000 | Tubel | |
| 6,122,499 A * | 9/2000 | Magnusson | 455/405 |
| 6,134,307 A | 10/2000 | Brouckman et al. | |
| 6,160,995 A | 12/2000 | Kiswani et al. | |
| 6,198,922 B1 | 3/2001 | Baynham | |
| 6,236,894 B1 | 5/2001 | Stoisits et al. | |
| 6,275,677 B1 | 8/2001 | Tandler | |
| 6,285,882 B1 | 9/2001 | Cornillat | |
| 6,314,288 B1 | 11/2001 | Murdock-Armstrong | |
| 6,338,140 B1 | 1/2002 | Owens et al. | |
| 6,421,727 B1 * | 7/2002 | Reifer et al. | 709/225 |
| 6,456,902 B1 | 9/2002 | Streetman | |
| 6,594,706 B1 | 7/2003 | DeCoursey et al. | |

(Continued)

FOREIGN PATENT DOCUMENTS

EP 1 103 149 2/2000

(Continued)

OTHER PUBLICATIONS

Developers Guide to Short Burst Data (Release 1.0, Jun. 1, 2003), Iridium Satellite LLC (provided under NDA) Iridium ISU AT Command References Version 2.0 (May 20, 2003).

*Primary Examiner*—Patrick N Edouard
*Assistant Examiner*—Chuck Huynh
(74) *Attorney, Agent, or Firm*—Bracewell Giuliani LLP

(57) ABSTRACT

A remote instrument control and reporting system utilizes a host communication gateway based on hardware and software that interfaces with a field device, remote terminal unit, or control system that operates across multiple communications infrastructures to a common back end data delivery system. This design allows Modbus hosts or similar SCADA polled technologies, such as a field bus that utilizes various industrial protocols to control instruments at and acquire instrumentation data from physically isolated installations. In particular, this design is well suited for applications such as oil well electrical submersible pumps. The data is communicated through, for example, a low Earth orbit satellite into a host communications gateway that simulates within a host computer environment the same polling registers that the data was collected from in the remote locations.

28 Claims, 6 Drawing Sheets

U.S. PATENT DOCUMENTS

| | | |
|---|---|---|
| 6,628,992 B2 * | 9/2003 | Osburn, III .................... 700/9 |
| 6,873,267 B1 * | 3/2005 | Tubel et al. ............. 340/853.3 |
| 2002/0169645 A1 | 11/2002 | Aronstam et al. |
| 2004/0148371 A1 * | 7/2004 | Lin et al. .................... 709/223 |
| 2005/0055407 A1 * | 3/2005 | Tandler et al. ............. 709/206 |

FOREIGN PATENT DOCUMENTS

| | | |
|---|---|---|
| WO | WO 97/18128 | 5/1997 |
| WO | WO 99/63680 | 12/1999 |
| WO | WO 00/07390 | 2/2000 |
| WO | WO 00/17803 | 3/2000 |
| WO | WO 01/61543 | 8/2001 |
| WO | WO 01/63435 A1 | 8/2001 |

* cited by examiner

SYSTEM, METHOD, AND APPARATUS FOR COMMAND AND CONTROL OF REMOTE INSTRUMENTATION

BACKGROUND OF THE INVENTION

1. Technical Field

The present invention relates in general to monitoring and controlling remote equipment and, in particular, to an improved system, method, and apparatus for command and control of electrical submersible pumps in oil wells via a host communication gateway to interface with a field device, remote terminal unit, or other instrumentation that operates across multiple communications infrastructures to a common back end data delivery system.

2. Description of the Related Art

The need for cost-effectively monitoring and controlling remotely-located oil wells has always been a challenge to the oil industry. Fortunately, recent technological innovations have significantly increased the efficiency with which such operations are managed. For example, a conventional or baseline installation incorporating a graphic motor switchboard or drive control system (GCS) 11 is shown in FIG. 1. In this installation illustrated, the GCS 11 is the primary control element. It is responsible for controlling components such as the downhole pump 13, motor 15, and associated tooling 17 (e.g., for gauging vibration, temperature, etc.), as well as gathering run time and operational information from these components.

The GCS 11 is typically a controller with Modbus protocol communication capabilities and offers an array of information that can be acquired via a Modbus interface. Modbus is an application layer messaging protocol at Level 7 of the OSI model (see, e.g., www.modbus.org). In a standard setup, the GCS 11 provides a standard Modbus RTU protocol 19 that supports, for example, a variety of function codes. The interface is typically run at, for example, 9600 baud and can provide a physical interface of either RS-232 or RS-485.

In this conventional network interface implementation, the GCS 11 is equipped to interface directly to any point in a multi-point Modbus host system 19 via a wired and wireless I/O interface 21 (and the like) to storage tanks 23 and other locations. The host system 19 issues a Modbus poll request for information from any of the GCS internal Modbus registers for subsequent display or application use. Commands to the GCS 11 are sent over the network in the same manner. However, this type of network topology does not lend itself well to the global communications (e.g., satellite) networks, and does not take full advantage of or leverage a TCP/IP based network infrastructure such as, for example, GEO VSAT, etc. Other limitations of this conventional Modbus poll/response network include: using the higher than necessary bandwidth, incapacity to be event driven, exclusively using the network medium, and being unable to offer authentication or encryption services. Thus, although conventional systems are workable an improved solution would be desirable.

SUMMARY OF THE INVENTION

The present invention comprises a very cost-effective system, method, and apparatus for a global, remote instrument control and reporting system. The system utilizes a host communication gateway based on hardware and software that interfaces with a field device, remote terminal unit, or control system that operates across multiple communications infrastructures to a common back end data delivery system. The present invention provides a low cost "plug and play" functionality that allows Modbus hosts or similar Supervisory Control And Data Acquisition (SCADA) polled technologies, such as a field bus that utilizes various industrial protocols (e.g., DH-485, DH+, ProfiBus, other FieldBuses, etc.), to control instruments at and acquire instrumentation data from physically isolated installations. In particular, this design is well suited for applications such as oil well electrical submersible pumps. The data is communicated through, for example, a low Earth orbit (LEO) satellite into a host communications gateway (HCG) that simulates within a host computer environment the same polling registers that the data was collected from in the remote locations. Likewise, commands and other data may be sent from the host to the remote locations.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
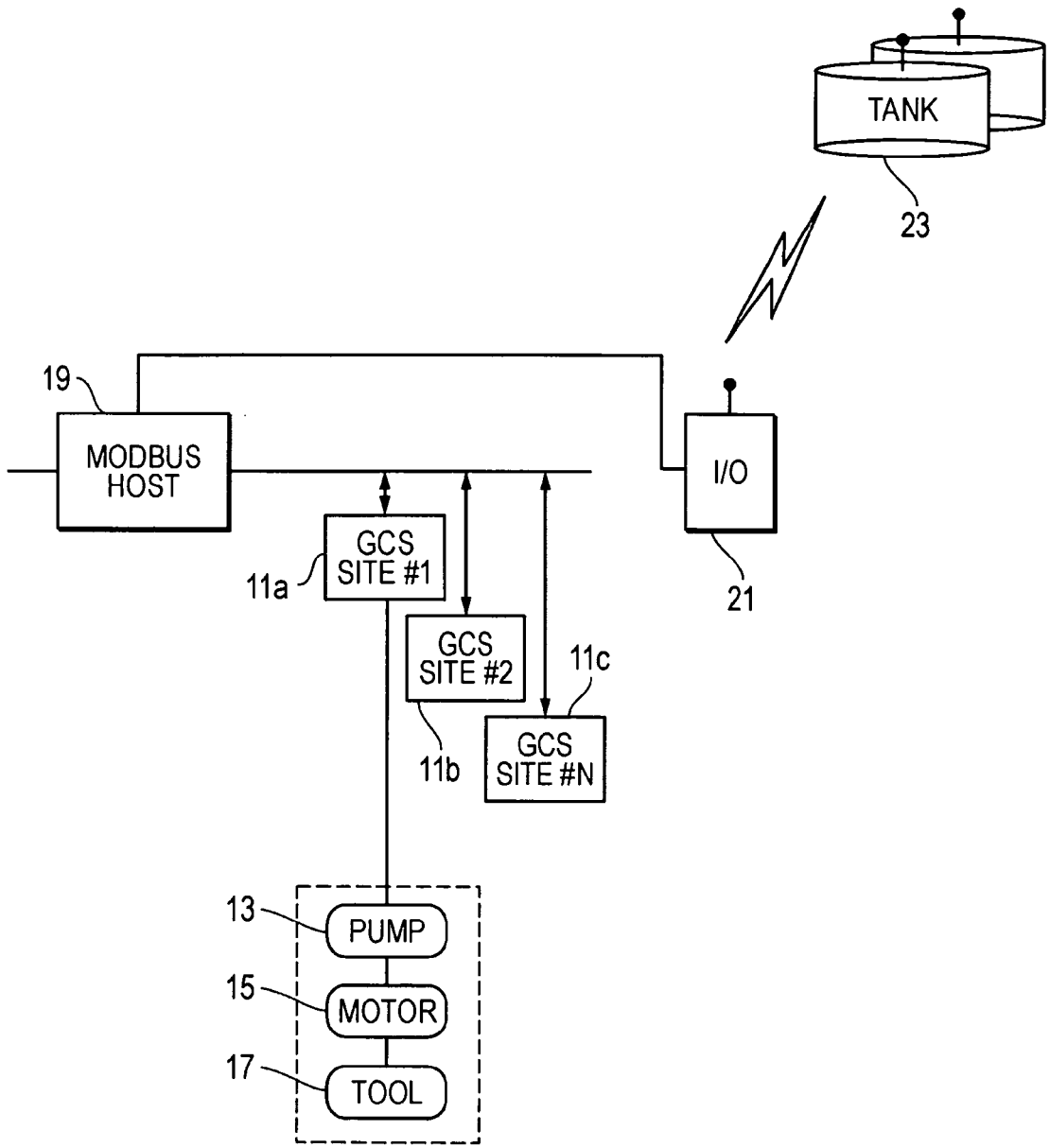
FIG. 1 is a schematic diagram of a conventional network communications topology for a host and remote site locations.
Figure 2:
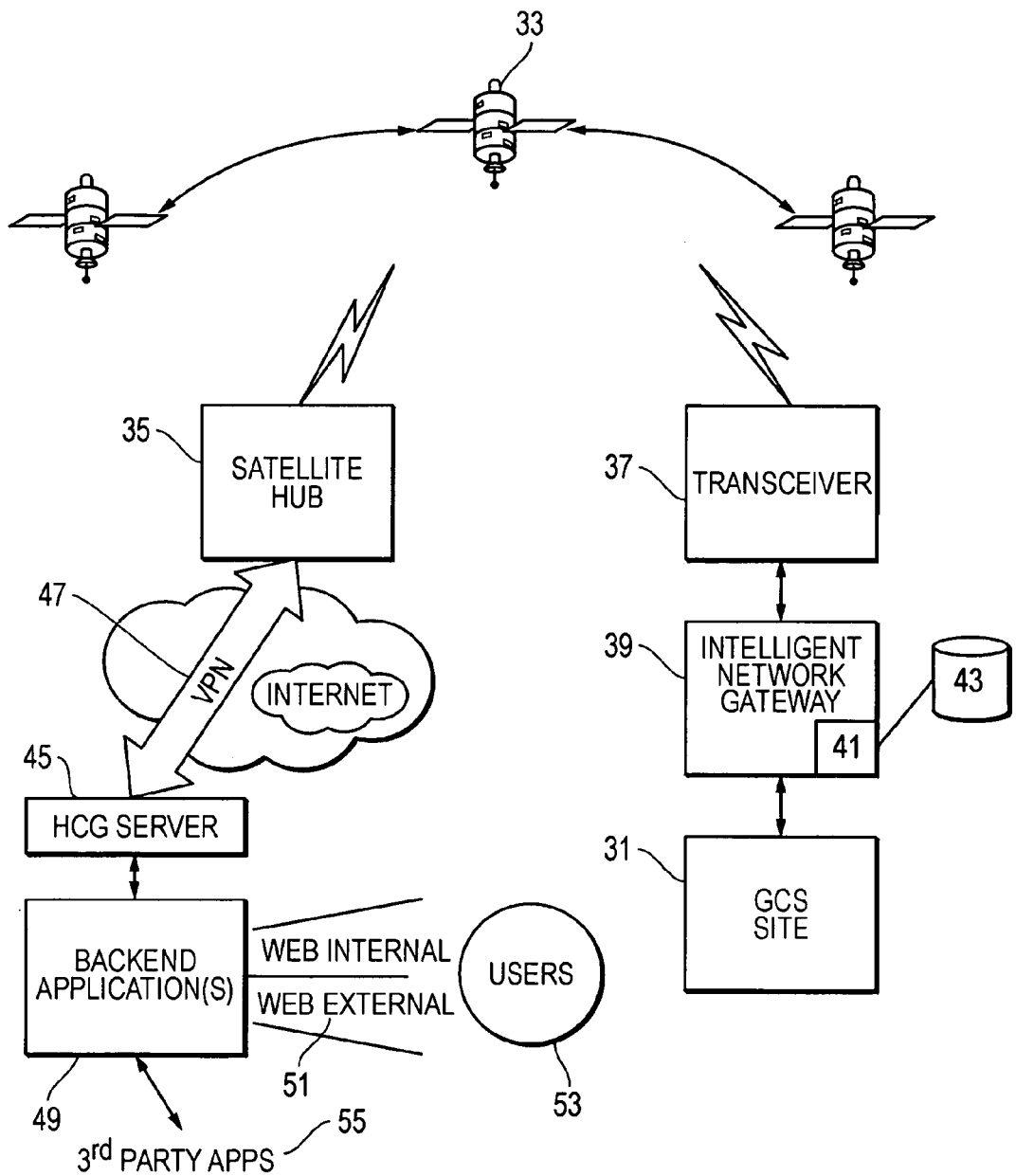
FIG. 2 is a schematic diagram of one embodiment of a network communications topology constructed in accordance with the present invention.

Referring to FIG. 2, one embodiment of a system, method, and apparatus for a global, remote instrument control and feedback system. The present invention is particularly well suited for applications involving downhole motors, pumps, cables, and associated tooling in oil wells. In order to control and monitor these various components, one embodiment of the present invention utilizes a microprocessor-based control system 31, such as a remote terminal unit (RTU) or Graphic Control System (GCS), that provides on-site control and monitor functions. These functions are performed by various components of the GCS 31 such as, for example, a motor controller, a user interface such as an LCD panel, a programmable or non-programmable variable speed drive, a motor switchboard, and a Modbus protocol interface.

In one application, a communication gateway-based product is specified to obtain a bandwidth-efficient interface to a Low Earth Orbit (LEO) satellite data network 33. Access to satellite data networks 33 may be established through a service provider hub 35, such as Iridium. Other operational and business advantages may be available by incorporating a communication gateway on installations that have communications infrastructures other that the Iridium solution. With such a communication gateway, the present invention has several advantages, such as event-driven alarm reporting, demand data scan, demand command capability, queued command capability, preventing well work-over and downtime to increase ROI, and providing data to other participants.

Transceiver Interface

A transceiver 37, such as an Iridium Subscriber Unit (ISU) Interface, is established to efficiently interface GCS locations 31 with the satellite data network 33 via communication gateways. In the topology illustrated in the embodiment of FIG. 2, a protocol translator 39 (e.g., an intelligent network gateway (ING)) interfaces the transceiver 37 with the GCS 31 via Modbus protocol. The system constantly polls for defined information. Although the information may comprise any or all Modbus register information, the desired information also can be reported at regular intervals (e.g., fixed periodic intervals, such as four times per day). In addition, the system can define alarms that are reported to back end applications 49 immediately.

Driver for Transceiver Protocol

A protocol adapter or driver 41 for the transceiver 37 enables the translator 39 to function within this environment to interface with a real time database 43. In one embodiment, the periodic and alarm events interface to this adapter, which is then responsible for formatting the data in a manner acceptable to, for example, the Iridium network Short Burst Data (SBD) service. Messages sent from the translator 39 to the server 45 may use Mobile Originated (MO) SBD message formats and associated transceiver command sets.

In one embodiment with the driver 41, messages may be formatted and sent to the GCS 31 via the translator 39 using either Short Messaging Service (SMS) or Mobile Terminated (MT) messages. In order for the translator 39 to receive SMS messages from the transceiver 37, an SMS "mailbox check" command is issued. Any SMS commands sent to a particular location using the SMS command set are not delivered automatically. However, MT messages are answered whenever an MO message is sent (i.e., mailbox checking is done at the same time). SMS also performs mailbox checks by actually checking the memory on the SIM card for messages, typically asynchronously from the MO messages.

Once configured, the driver 41 constantly checks for the availability of a transceiver unit 37 at the configured serial interface port. In one embodiment, the transceiver command +AT (SBD Status) is used to validate the connection and operation of a transceiver 37 indicating that a transceiver unit 37 is indeed connected to the system and available for use. This information also is available locally for troubleshooting purposes. In an embodiment utilizing SMS messaging, the transceiver then issues a +CMGL command to check for SMS messages and, if queued, delivered to the translator 39. The detection of SMS messages are properly handled as the SMS mailbox checks the logic of the translator 39. This section addresses any future possibility of SMS messaging that would arrive unsolicited. Control can be originated through the system via SMS text messages with, for example, a proprietary encryption key. One of the advantages of SMS text messages is that they deliver data without mailbox checks directly to the transceiver 37 asynchronously from scheduled SBD transactions, are made available to the translator 39, and they are very economical.

Mobile Originated Driver Interface

In one embodiment, the MO driver interface is responsible for interfacing to the translator real time database 43 and/or the user application model. When it is determined that data needs to be sent via the transceiver interface, the driver 41 is presented with a binary payload of data to be sent.

The first step is to format the data (e.g., the designated Modbus register information) in a format to be appended to the email. Checks also are performed to ensure that the size of the payload to be sent does not exceed the maximum payload size that can be handled by the transceiver unit (e.g., 1960 bytes). This data payload is loaded into the transceiver 37.

Figure 3:
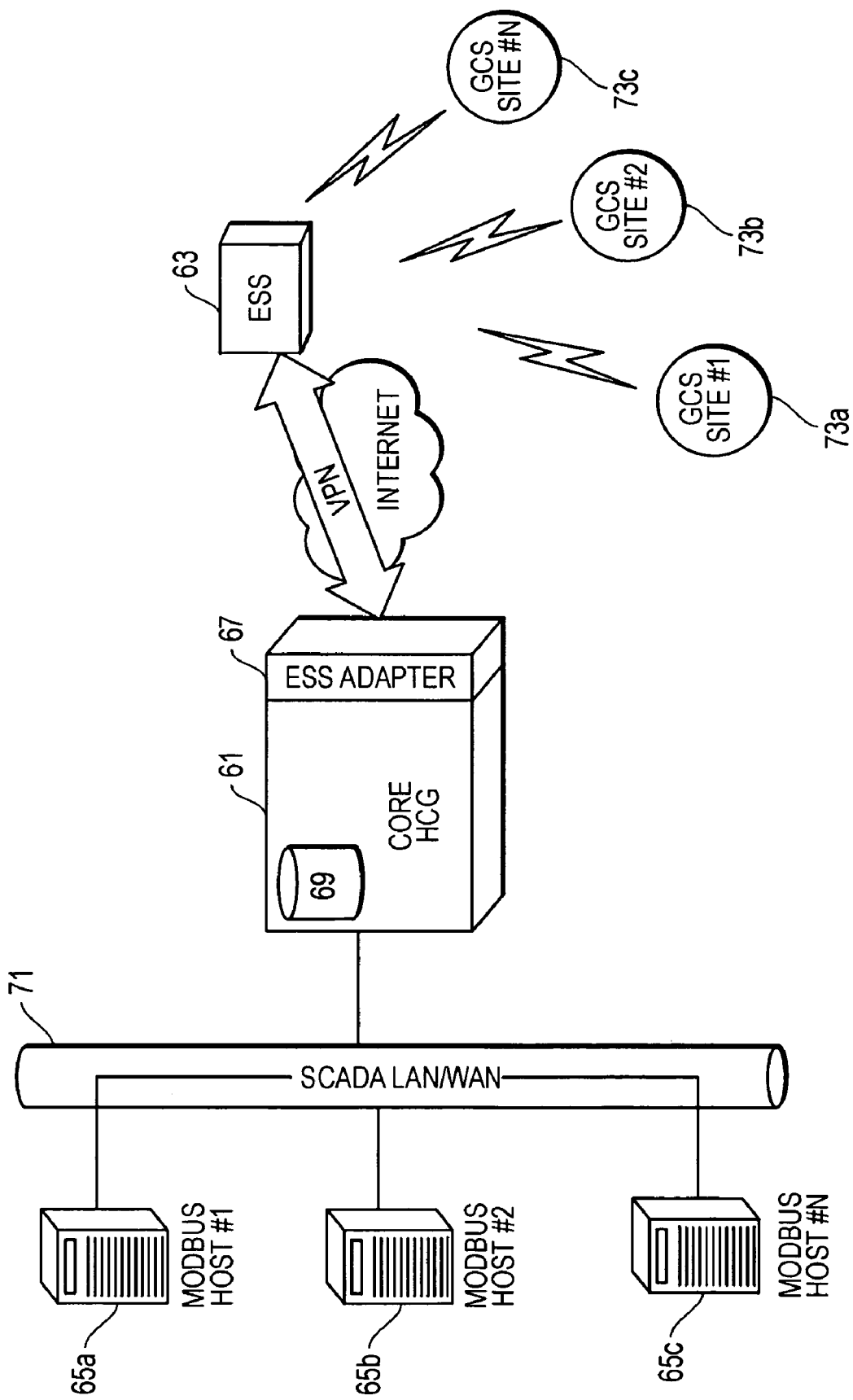
FIG. 3 is a schematic diagram of another embodiment of a network communications topology constructed in accordance with the present invention.

Once a binary payload has been loaded into the transceiver 37 successfully, the next step is to instruct the transceiver 37 to initiate an SBD session. This causes the transceiver 37 to establish a session between the transceiver 37 and an Iridium Earth terminal controller SBD Subsystem (ESS) (see FIG. 3). The driver 41 issues a +SBDI (i.e., initiates an SBD session) command that accomplishes the following: any payload previously loaded into the transceiver buffer is formatted and transferred to the ESS for subsequent delivery to the end application via email. However, in another embodiment, the initiation of an SBD session also causes the transceiver to download any pending "MT" messages on the ESS with a serial number (e.g., IMEI) of the associated transceiver. In another embodiment, any MO session automatically checks for MT messages. The following section on MT messages addresses what happens with the MT message payload. Regardless of actual message payload size, the minimum charge unit of data is 30 bytes, as specified by Iridium. This requirement is taken into consideration in the designation of payload information.

MT Driver Interface

The other section of a complete driver interface comprises handling MT messages. Whereas the data for MO messages is usually derived from register information from the GCS 11 or other site equipment, the contents of a MT payload usually results in an associated Modbus command being issued to the attached local equipment. If the system configuration is set up to check for MT messages at a periodic interval faster that the MO message rate, then the driver will perform a Mailcheck by issuing a transceiver +SBDI with an empty message buffer. This results in the transceiver 37 checking for any emails with the unit's associated IMEI identity but not sending any outgoing messages.

If the result of the transceiver +SBDI command indicates a message is available, the associated binary payload from the transceiver buffer is retrieved using the +SBDRB (read binary data from transceiver) command. Issuing this command to the transceiver 37 causes the transceiver 37 to send the binary payload from its internal buffer to the translator 39. The MT driver calculates the proper 2-byte checksum for the data payload and compares this with the transceiver internal checksum to validate the data before transferring it to the translator internal database.

Once the binary message is retrieved from the transceiver 37, the action to be performed is determined by the contents of the message. It is assumed that the contents will dictate some action required by the translator 39. For example, the contents of the binary message may indicate that a shut down operation needs to be performed. The associated Modbus coil information in the message indicates the value and register location that need to be written to. The translator 39 then formats a proper Modbus command to force the coil location to the specified value. This example also is extended to both multiple coil write capability and single/multiple register write capability.

Configuration Parameters

Associated with the Iridium transceiver driver 41, a set of configuration parameters is added to the driver interface within the software utility (e.g., ACE configuration utility) that allows a user interface to configure the translator 39 a Host Communications Gateway (HCG) 45. In one embodiment, the configuration parameters identified are:

| Parameter | Default Value | Definition |
| --- | --- | --- |
| Assigned Comm Port | COM2 | Assigned Com port the transceiver is attached to |
| Baud Rate | 19,200 | Assigned baud rate for transceiver |
| Reporting Period | 8 hours | Periodic rate at which defined messages are sent to the server |
| Mailcheck Period | 4 hours | If using MT messaging, per this specification, MT messages will be checked at the Reporting Period interval. If more frequent MT message checks are required, then that period would be entered here. |
| SMS Message Check Period | 2 minutes | If using SMS, then the SMS mailbox is checked this often, regardless of scheduled MT messages |

By adding a transceiver configuration object to the configuration utility, the transceiver protocol driver 41 becomes integrated into the configuration process.

Iridium Earth Terminal Controller SBD Subsystem (ESS) Interface

In order to present a unified messaging infrastructure, a server side component may be developed to facilitate interfacing Iridium-equipped GCS sites transparently with non-Iridium sites. This interface serves as the translation component between standard messaging (e.g., from a Modbus Master host system or a back end infrastructure 49) and the unique transport characteristics required by the Iridium system. Back end applications 49 may comprise a Modbus host or other system, internal or external web access 51 for end users 53, and/or third party applications 55, such as web notification, etc.

Some baseline development in non-persistent messaging on the server side may be used with the HCG 45. Although developed for a LEO satellite provider other that Iridium, the framework required for a non-persistent data feed to legacy host SCADA systems may be used. The function of the HCG 45 is to provide the interface to the "e-mail" based messaging on the Iridium side of the network (both MO and MT based messages) to a real time polling Modbus host system. The scope may be extended to also add, for example, IBM Websphere® (MQ) messaging as well.

The HCG 45 owns a configuration for each Iridium-based transceiver 37 and translator 39 attached to a field device (e.g., GCS 31 in the illustrated embodiment). Once configured, these units are available as "virtual" GCS units or other field devices from the perspective of a conventional Modbus host system. MO messages issued from remote GCS sites 31 are received by the HCG 45 via an Internet-based, virtual private network (VPN) 47 to the Iridium hub 35. Once received and validated, the contents of the binary attachments are built into a persistent database in Modbus format. The polling Modbus host system may then poll the virtual database as any other conventional Modbus device. Commands issued from the Modbus host are formatted by the HCG into proper MT of SMS messages and sent via the ESS for subsequent retrieval by the remote translator. Configuration information provides the proper translation between Modbus RTU address and associated IMEI identities (e.g., serial number of transceiver 37).

Capabilities built into the HCG 45 include the diagnostic capability required to interface host systems that expect a constant data feed (i.e., Modbus Host systems) and a non-persistent based connection methodology as presented by the Iridium network. This includes data diagnostic capabilities, latitude and longitude, time-stamp indication of last transaction, and transaction sequence number verification. Transaction sequence numbers ensure data integrity by ensuring no sequential MO messages have been lost.

Modbus Only

In one embodiment (FIG. 3), a Modbus-only implementation of the HCG 61 results in a network topology. The function of the HCG 61 is to provide an interface between the email-based messaging from the ESS 63 and one or more Modbus host systems 65. The major components may comprise: an Iridium ESS adapter 67, an HCG virtual database 69, HCG Modbus interface 71 connections (e.g., Localhost, WAN, LAN, etc.), and system configuration and diagnostic tools. Initial system deployment may comprise creating a system configuration for the HCG 61. The GCS sites 73 are configured as associated with a Modbus virtual host feed. The host feed concept groups multiple virtual databases as received from the translator onto a TCP/IP socket connection (i.e., a socket connection defined as the server IP address in conjunction with a user specified port number).

Once the initial system is configured it is brought online with proper network connectivity to both the ESS and the Modbus host network. Initially, as the Modbus host(s) connect and begin polling for data, a "no response" would result since there is no initial data in any of the host feed virtual databases. As messages start arriving from remote site locations, each non-persistent database would become valid. Subsequent polls from the Modbus host for associated remote units would result in the HCG constructing a valid Modbus response and replying to the poll. The HCG continues responding with "last known good" (LNG) data until it is determined that the remote site has exceeded its report period time or an invalid transaction sequence number is detected.

Conversely, attached Modbus hosts also may issue write commands to a unit attached to a configured host feed. If the unit is considered in an online state (i.e., it has valid data from the last reporting period with proper transaction sequence numbers), the command is translated into a format that the translator understands and an email message is sent with the data attached as a binary attachment. However, with SMS the data is embedded in the body of the SMS message as per standard SMS protocol. Subsequently, the HCG responds to the Modbus host with the proper command response so that, from an operational stand point, the functionality of the Modbus host is unchanged. If the associated unit is in an offline condition, then the HCG responds to the host with a valid Modbus exception code to indicate that the command will not be sent.

Commands sent in this manner arrive at the remote site as an MT formatted message or SMS text message the next time the translator either does a Mailcheck or on its regular periodic update. Alternatively, the commands may be sent via encrypted SMS text messages that arrive at the remote site immediately. The translator then extracts the command information from the payload as received from the transceiver and translates it back into the original command structure to issue it to the GCS.

In summary, using the HCG in Modbus-only mode creates a server that "emulates" a true Modbus multidrop network to decrease or eliminate any customer modifications to the Modbus host machines. This emulation capability also lets the HCG work in conjunction with other true Modbus multidrop circuits for a total system solution.

Messaging Broker

Figure 4:
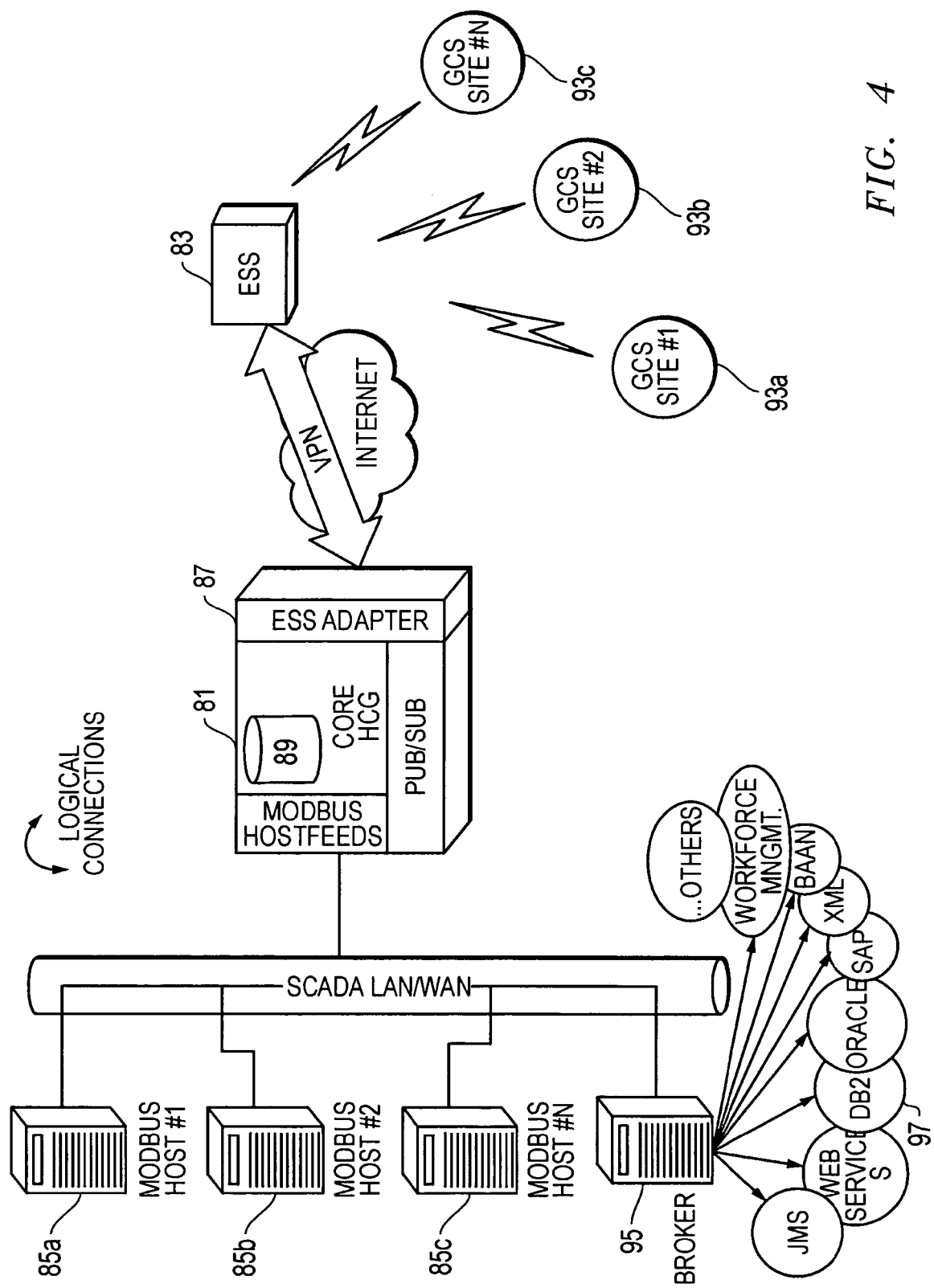
FIG. 4 is a schematic diagram of yet another embodiment of a network communications topology constructed in accordance with the present invention.

Although the Modbus emulation capabilities of the HCG provide a transparent connection via the Iridium network, there may be additional goals to be satisfied. Given the large scale deployment of such a project, other factors, such as multiple data consumers, system scalability, redundancy, high availability, data translation, etc., may be considered. Consideration also is given to future data consumer requirements that may not be fully identified, but which invariably become requirements as the system matures and the full impact of the data availability is realized. To this end, one embodiment of the present invention (FIG. 4) interfaces to, for example, an IBM WebSphere® middleware messaging component, "WebSphere® Business Integrator Message Broker" (WBIMB), hereinafter, "Broker."

Although not a requirement, the Broker connectivity works in parallel to provide Modbus connectivity to existing legacy hosts 85. The ESS adaptor 87 for the HCG 81 is responsible for providing two levels of conversion for any MO message received from the ESS 83. The first responsibility is to place the data (if so configured) into the associated GCS virtual database 89. The second is to further process the message and then "publish" the resulting data to the Broker 95.

The Broker-based solution provides a rich set of business adaptors and tools 97 for work flow and data flow management. Using this architecture provides flexibility and data transformation tooling for delivery direct from the GCS 93 to the applications 97 that require the data. In many situations it is possible to manipulate Modbus-type architectures for this purpose, but over time as the number of adapters and data consumer requirements increase, the use of conventional SCADA-type technology may become problematic from a support and deployment standpoint.

Total System Solution

Figure 5:
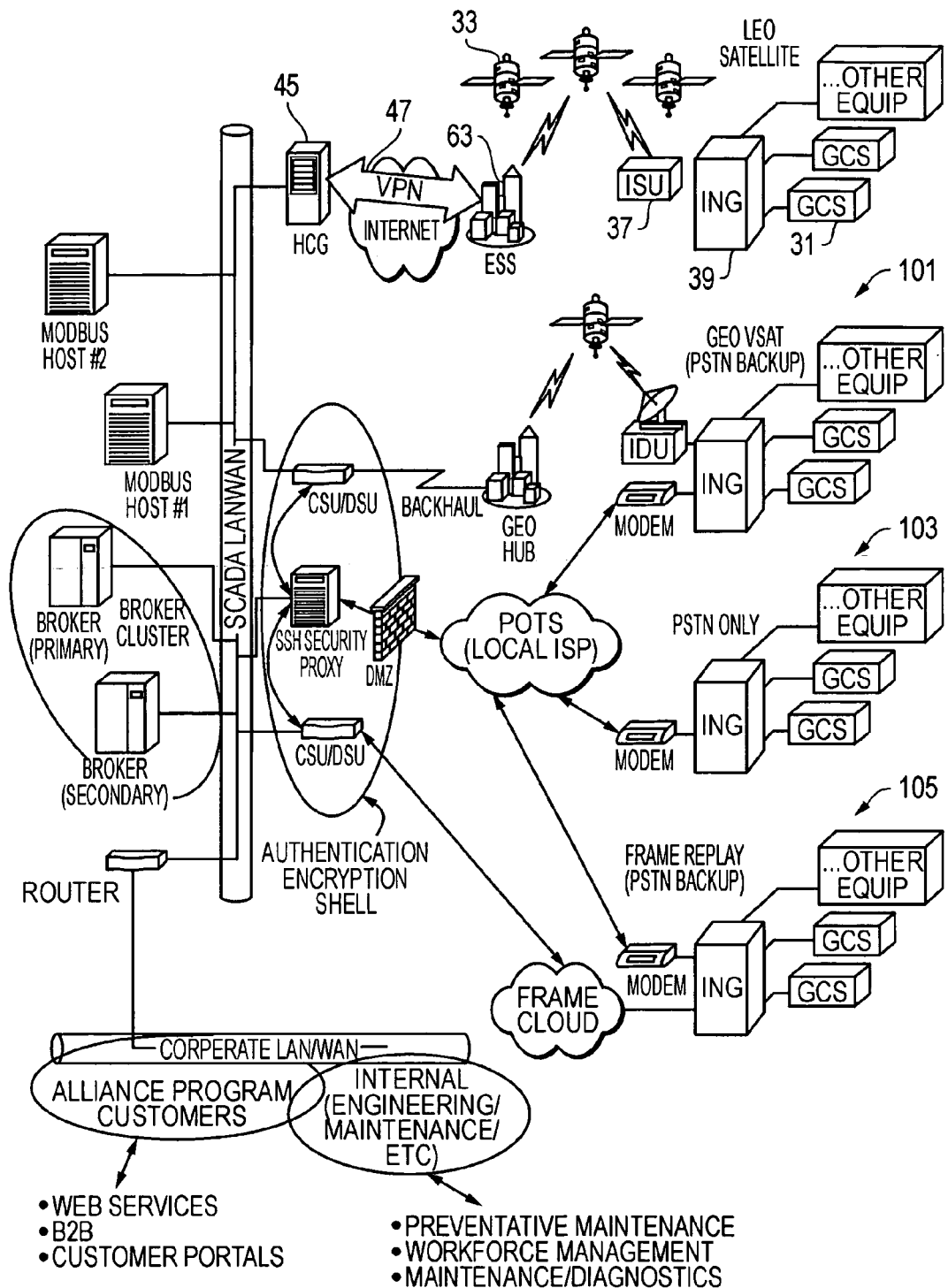
FIG. 5 is a schematic diagram of still another embodiment of a network communications topology constructed in accordance with the present invention.

Referring now to FIG. 5, one embodiment of a total system infrastructure solution is presented that not only addresses GCS assets that are operating on the Iridium network (uppermost translator 39; cf. FIG. 2), but all network infrastructures taken as an overall "fabric" solution. Other potential systems include, for example, a geosynchronous satellite system 101, a telephone-based system 103, and/or a frame relay system 105 based on a dedicated line. By extending the functionality of the GCS and other co-located site equipment to become part of a centric TCP/IP network, architecture greatly enhances the access and accuracy of the field data, adds authentication and data encryption (if required), and increases deployment to different consumer applications by an order of magnitude.

Baseline Translator Functionality

As designed, the translator is a remote polling master that communicates with a large number of end devices. Although the present invention focuses on the Modbus protocol, many other types and variations of field device protocols may be used. Being a polling master, the translator basically distributes the poll process of field devices to the actual site instead of polling over the network infrastructure. This capability along with the concept of "report by exception" technologies and deeply embedded TCP/IP capabilities make the translator infrastructure a very flexible and powerful solution. The distributed polling concept along with the fact that TCP/IP topologies are actually more efficient in an event-driven mode, increase the number of field units on any given network, and increase "actual" response time of any event in the field to that event being delivered by an order of magnitude as compared to a polling system.

The extensive use of TCP/IP in conjunction with awareness of SCADA paradigms allows users to take full advantage of a TCP/IP connection without the added overhead of additional equipment that may not be suited for use in hostile environments. For example, the translator can perform many of the tasks that a router and/or terminal server may perform in addition to the intelligent interface to all field equipment. In addition to the Iridium specific components of this document, the following standard functionality is included.

TCP/IP Centric Design

Although designed for use within conventional SCADA paradigms, the translators are based on solid TCP/IP capabilities. The following TCP/IP functions are available as standard: SLIP—serial line IP; PPP—point-to-point protocol (replaces SLIP in most applications); Ping—ICMP connectivity test utility; Telnet—low bandwidth text terminal utility (SSH for secure mode); FTP—file transfer protocol (SFTP for secure mode); router; IBM Broker MQTT Pub/Sub Engine; and security. Depending on the hardware platform chosen (or option card added) support is also available for 10/100BaseT Ethernet (one, two, or three NIC interfaces depending upon application), and CSU/DSU frame relay interface.

Multi-Route Determination

As described above, the translator supports multiple TCP/IP adaptors and physical interface protocols (SLIP, PPP, Ethernet, Frame Relay). This provides the user with multiple routes back to server applications. A route table with an associated destination server table allows "matrix configuration" of servers/networks.

For example, the primary physical TCP/IP route may be configured as 10BaseT using a GEO VSAT IDU, and the secondary physical TCP/IP route may be configured as dial-up PPP using a modem. In conjunction with this configuration there may be two destination servers (e.g., either HCG's or Brokers). Given this matrix, the following network connection determination may occur: #1 Primary Network to Primary Server, #2 Primary Network to Secondary Server, #3 Secondary Network to Primary Server, #4 Secondary Network to Secondary Server. In this example, the most probable scenario is that when a rain fade occurs at the location on the VSAT interface, the translator automatically fails over to the Secondary network via modem/PPP. Once it is determined that connectivity on the primary network was re-established, the Primary network connection via VSAT is restored and the modem connection dropped.

Polling Engine

As specified above, the translators support a polling engine concept that basically becomes a distributed remote master device. This specification alludes to the fact that this engine is a Modbus host, but the infrastructure is flexible enough to support almost any poll/response protocol. The polling engine can be controlled strictly through a GUI-based configuration tool, or can be augmented by user applications written in, for example, IsaGraf. The resulting data from the polling engine then feeds a real time database model. The database drivers then issue events based on change of state or dead-band deviation as required.

Terminal Server/Terminal Client

Once a TCP/IP connection is available at any remote telemetry site, the Terminal Server and Terminal Client support become important tools for the user. A Terminal Server service is basically the concept of associating a serial interface port (e.g., either RS-232 or RS-485/422) with a "logical"

TCP/IP socket (e.g., with a socket being defined as the TCP/IP address on the translator unit and a numeric port number). The following examples demonstrate where the Terminal Server functionality might be used.

In one example (for a given site), the polling engine is configured to report a certain set of Modbus register data in real time (or at a given rate). However, once a day, a special set of registers is pulled out by another host computer system. In this situation, a Terminal Server service is configured to run on a arbitrary TCP/IP port number (e.g., 8080) with the device serial port specified. When desired, the host computer wishing to pull this "special" information would make a TCP/IP socket connection to the TCP/IP address of the associated translator. Once this connection is established, the connecting host computer sends Modbus commands that are properly interleaved with the polling engine and the response is directed back over the Terminal Server connection.

In another example, remote field equipment has a programming or diagnostic port available for use in many situations. It is also the case that this port is not usually available to the SCADA host computer system and is therefore only available for onsite programming/diagnostics. In this case, a Terminal Server port may be configured to attach a remote host via a TCP/IP socket connection to the programming/diagnostic port of the equipment. Once set up, an engineer or technician has access to all field devices via a network connection and avoid a site visit to accomplish the same task locally.

Remote Protocol Analyzer

Diagnostics are an important tool in deploying and maintaining any SCADA network. To this end, every Polling Master protocol implementation is interfaced to Telnet for the purpose of remote protocol diagnostics. This allows engineers and technicians to log onto a translator and, via standard Telnet, examine the hex data flowing into and out of any given serial port in the system that is associated with a polling master function.

Multi-Master Port Sharing

Even though the MultiMaster scenario was detailed in the Terminal Server section above, multiple polling masters may be interfaced to a single piece of field equipment with the translators in place on a network, despite the poll/response protocol being intended for single master implementations. This provides for very simple operational set up, such as a local laptop master polling the GCS in parallel with polls issued for the purpose of reporting information over the Iridium system. More complex scenarios are possible in applications where higher bandwidth TCP/IP connections are available wherein one or more Modbus masters are polling an associated GCS in parallel with the translator.

Multi-Protocol Per Serial Port

Another important feature of the translators (especially in topology constrained systems) is that multiple Polling masters may be associated with the same serial interface port. For example, a field network constrains that two pieces of equipment must coexist on the same network one with Modbus RTU protocol and the other with Modbus ASCII protocol. The two logical polling engines may be configured to use the same serial port in this situation, and round-robin polling would occur over the same serial port but with protocol switching occurring on the fly.

Router

With a complete TCP/IP services stack, router functionality is natively available. Ethernet/PPP/SLIP physical level protocols are supported in addition to firewalling/security tools that leverage the translator as a router replacement in many typical topologies and applications.

Authentication/Encryption Services

Given the role of security in today's IT environment, the ability to add both authentication and encryption to existing infrastructures is crucial. Using the open standards SSH (secure shell), the translator can provide multiple user-defined levels of both authentication and encryption for any or all connections into the translator. When security is an issue, the standard Telnet and FTP facilities are replaced by their secure equivalents of SSH and SFTP (secure FTP).

User Application Model

IEC1131 is a standard application model supported by many of the leading industrial control computer manufactures. In one embodiment, the translator includes an IEC1131 engine as a "tool" to control data flow within a given topology. Parameters such as data deadbands, reporting periods, data transformation, and control functions can be implemented using the IEC1131 tooling.

Broker Publish/Subscribe Support

One of the native adaptors available on the translator is support for IBM's lightweight Publish/Subscribe (Pub/Sub) protocol Websphere® MQ Agent telemetry transport (MQTT). MQTT is an event-driven messaging paradigm offering three levels of quality of service and guaranteed delivery of data. In many applications, this offers a truly event-driven messaging paradigm directly into back office types of applications while retaining many of the characteristics associated with conventional legacy SCADA poll/response infrastructures.

Figure 6:
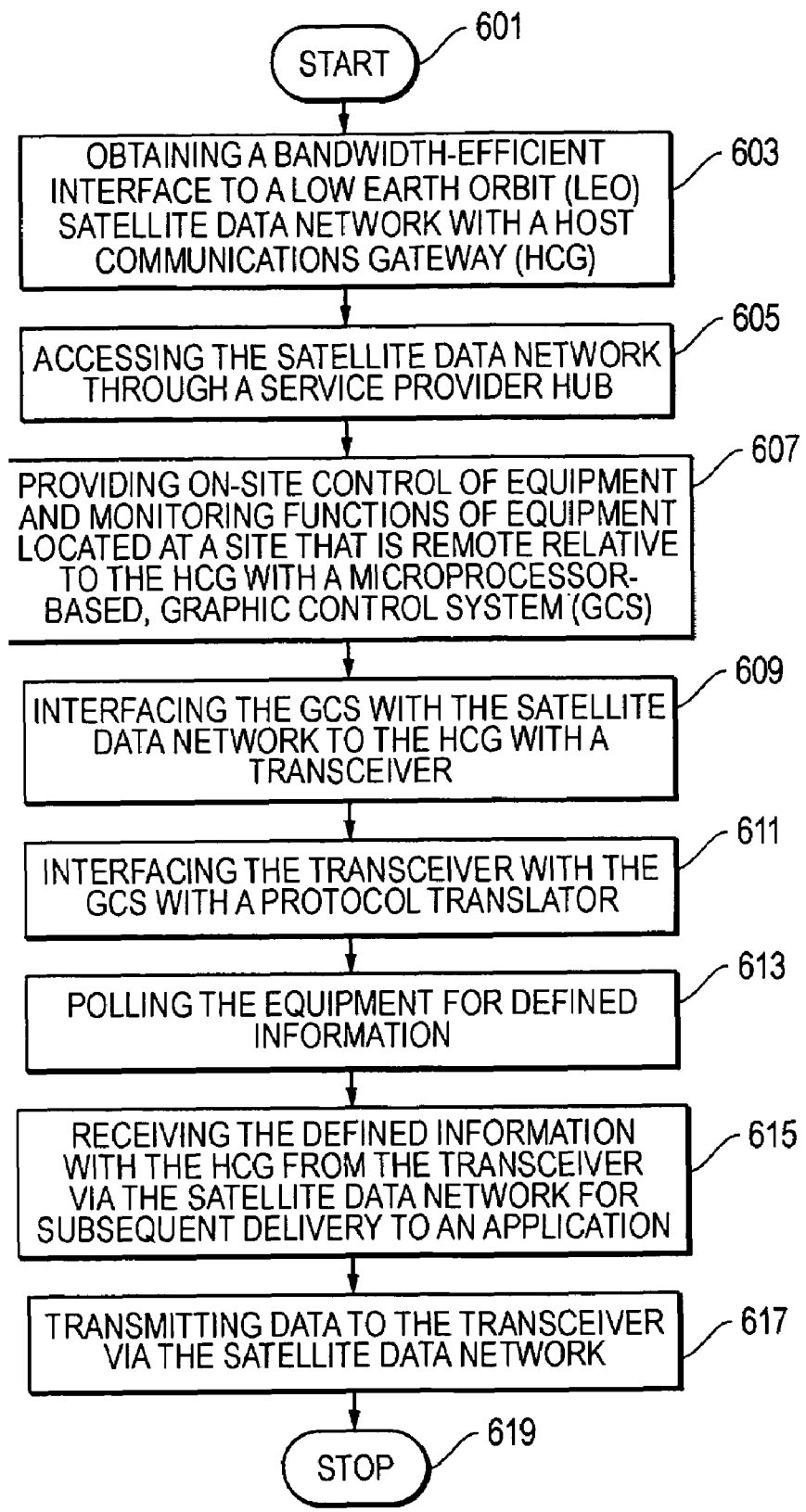
FIG. 6 is a diagram of one embodiment of a method of global remote instrument control and feedback.

Referring now to FIG. 6, one embodiment of a method of global remote instrument control and feedback is disclosed. Starting as indicated at step 601, the method comprises: obtaining a bandwidth-efficient interface to a LEO satellite data network with an HCG (step 603); accessing the satellite data network through a service provider hub (step 605); providing on-site control of equipment and monitoring functions of equipment located at a site that is remote relative to the HCG with a microprocessor-based, GCS (step 607); interfacing the GCS with the satellite data network to the HCG with a transceiver (step 609); interfacing the transceiver with the GCS with a protocol translator (step 611); polling the equipment for defined information (step 613); receiving the defined information with the HCG from the transceiver via the satellite data network for subsequent delivery to an end application (step 615); and transmitting data to the transceiver via the satellite data network (step 617); before ending as indicated at step 619.

While the invention has been shown or described in only some of its forms, it should be apparent to those skilled in the art that it is not so limited, but is susceptible to various changes without departing from the scope of the invention.

What is claimed is:

1. A system for global remote instrument control and feedback, the system comprising:
    a host communications gateway (HCG) having an interface to a low Earth orbit (LEO) satellite data network, wherein access to the satellite data network is established through a service provider hub;
    a microprocessor-based control system that provides, at a first data rate, on-site control of oil well equipment and monitoring functions of oil well equipment located at an oil well site that is remote relative to the HCG;
    a transceiver for interfacing the control system with the satellite data network, wherein the satellite data network communicates at a second data rate, the second data rate being lower than the first data rate and being less than or equal to about 19,200 baud; and a protocol translator for interfacing the transceiver with the control system, wherein the HCG receives defined information from the control system using the transceiver via the satellite data network for building a database;

wherein the control system updates the defined information in the database using an event-driven communication mode;

wherein the HCG permits the database to be constantly polled by an end application at a third data rate, the third data rate being higher than the second data rate and being greater than or equal to about 10BaseT ethernet;

wherein a last known good value for the defined information is subsequently delivered to the end application to satisfy the constant polling at the third data rate; and wherein the HCG transmits data to the transceiver via the satellite data network.

2. A system according to claim 1, wherein the equipment comprises downhole motors, pumps, cables, and associated tooling in oil wells.

3. A system according to claim 1, wherein the control system functions are performed by components comprising a motor controller, a graphics interface, a variable speed drive, a motor switchboard, and a Modbus protocol interface.

4. A system according to claim 1, wherein the control system provides to the HCG each of demand data scan and demand command capability.

5. A system according to claim 1, wherein the transceiver is an Iridium Subscriber Unit (ISU) Interface.

6. A system according to claim 1, wherein the protocol translator comprises an intelligent network gateway (ING) that transfers data via a Modbus protocol, and the defined information comprises Modbus register information.

7. A system according to claim 1, wherein the defined information is reported at fixed periodic time intervals to the HCG from the control system response to a control system event, and wherein these fixed periodic time intervals are longer than polling intervals of the end applications.

8. A system according to claim 1, wherein the transceiver includes a protocol driver that enables the translator to interface with a real time database provided in the HCG.

9. A system according to claim 1, wherein the defined information is formatted as Short Burst Data (SBD) and is selected from the group consisting of Short Messaging Service (SMS) and Mobile Terminated (MT) messages; and wherein the defined information is appended to an email and a size thereof is limited to a maximum payload size that can be handled by the transceiver.

10. A system according to claim 9, wherein the maximum payload size is 1960 bytes.

11. A system according to claim 1, wherein the service provider hub communicates through a virtual private network via the Internet to a host system and a back end infrastructure comprising internal or external web access for end users and third party applications.

12. A system according to claim 11, wherein the HCG forms a virtual database of the defined information and can poll the virtual database to simulate real time information to the back end infrastructure.

13. A system according to claim 1, further comprising a message broker for providing Modbus connectivity to existing legacy hosts, such that the HCG provides at least two levels of conversion for any mobile originated (MO) message received from a terminal controller subsystem (ESS), including placing data into an associated GCS virtual database, and processing messages and publishing resulting data to the message broker, which provides a set of business adaptors and tools for work flow and data flow management.

14. A system according to claim 1, further comprising a total network system infrastructure solution including, but not limited to, a geosynchronous satellite system, a telephone-based system, and a frame relay system based on a dedicated telecommunications line, to enhance access and accuracy of data, add authentication and data encryption, and increase deployment to other applications.

15. A method of global remote instrument control and feedback, the method comprising:
  (a) obtaining an interface to a low Earth orbit (LEO) satellite data network with a host communications gateway (HCG);
  (b) accessing the satellite data network through a service provider hub;
  (c) providing, at a first data rate, on-site control of equipment and monitoring functions of equipment located at a site that is remote relative to the HCG with a microprocessor-based, graphic control system (GCS);
  (d) interfacing the GCS with the satellite data network to the HCG with a transceiver network, wherein the satellite data network communicates at a second data rate, the second data rate being lower than the first data rate and being less than or equal to about 19,200 baud;
  (e) interfacing the transceiver with the GCS with a protocol translator;
  (f) receiving defined information into the HCG from the transceiver via the satellite data network for building a database;
  (g) updating the defined information in the database from the GCS using an event-driven communication mode;
  (h) constantly polling the database at a third data rate for defined information by an end application, the third data rate being higher than the second data rate and being greater than or equal to about 10BaseT ethernet; and
  (i) subsequently delivering a last known good value for the defined information by the HCG to the end application to satisfy the constant polling at a third data rate; and
  (j) transmitting data to the transceiver via the satellite data network.

16. A method according to claim 15, wherein step (c) comprises controlling and monitoring downhole motors, pumps, cables, and associated tooling in oil wells.

17. A method according to claim 15, wherein step (c) comprises performing the GCS functions with a motor controller, a graphics interface, a programmable variable speed drive, and a Modbus protocol interface.

18. A method according to claim 15, further comprising providing the HCG with immediate event-driven alarm reporting, demand data scan, demand command capability, queued command capability, prevention of work-over and downtime, and data to other participants.

19. A method according to claim 15, wherein step (d) comprises interfacing via an Iridium Subscriber Unit (ISU) Interface handset.

20. A method according to claim 15, wherein step (e) comprises interfacing via an intelligent network gateway (ING) that operates on a Modbus protocol, and the defined information comprises Modbus register information.

21. A method according to claim 15, further comprising reporting the defined information at fixed periodic time intervals to the end application.

22. A method according to claim 15, further comprising enabling the translator to interface with a real time database provided in the HCG.

23. A method according to claim 22, further comprising formatting the defined information as Short Burst Data (SBD) selected from the group consisting of Short Messaging Service (SMS) and Mobile Terminated (MT) messages; and appending the defined information to an email and limiting a size thereof to a maximum payload size that can be handled by the transceiver.

24. A method according to claim 15, further comprising communicating with the service provider hub through a virtual private network via the Internet to a host system and a back end infrastructure comprising internal or external web access for end users and third party applications.

25. A method according to claim 24, further comprising forming a virtual database of the defined information with the HCG, and polling the virtual database to simulate real time information to the back end infrastructure.

26. A method according to claim 15, further comprising providing Modbus connectivity to existing legacy hosts with a message broker, such that the HCG provides at least two levels of conversion for any mobile originated (MO) message received from a terminal controller subsystem (ESS), including placing data into an associated GCS virtual database, and processing messages and publishing resulting data to the message broker to provide a set of business adaptors and tools for work flow and data flow management.

27. A method according to claim 15, further comprising providing a total network system infrastructure solution including, but not limited to, a geosynchronous satellite system, a telephone-based system, and a frame relay system based on a dedicated telecommunications line, to enhance access and accuracy of data, add authentication and data encryption, and increase deployment to other applications.

28. A method of global remote instrument control and feedback, the method comprising:
- (a) providing on-site control of equipment and monitoring functions of equipment located at an oil well site with a control system;
- (b) interfacing the control system with a satellite data network, wherein the satellite data network communicates at a first data rate, the first data rate being less than or equal to about 19,200 baud;
- (c) interfacing a remote host communications gateway (HCG) with the satellite data network;
- (d) receiving defined information from the control system into the HCG via the satellite data network for building a virtual database including defined information regarding the equipment;
- (e) updating the defined information in the virtual database from the control system using an event-driven communication mode;
- (f) constantly polling the virtual database at a second data rate for defined information by an end application, the second data rate being higher than the first data rate and being greater than or equal to about 10BaseT ethernet; and
- (g) subsequently delivering a last known good value for the defined information by the HCG to the end application to satisfy the constant polling at the second data rate.

* * * * *